United States Patent [19]

Warren

[11] Patent Number: 5,705,297
[45] Date of Patent: Jan. 6, 1998

[54] ELECTRICAL CONNECTION FOR A POLYMERIC LAMINATE BATTERY STRUCTURE

[75] Inventor: Paul C. Warren, Far Hills, N.J.

[73] Assignee: Bell Communications Research, Inc., Morristown, N.J.

[21] Appl. No.: 610,023

[22] Filed: Mar. 4, 1996

[51] Int. Cl.$^6$ ............................................. H01M 2/22
[52] U.S. Cl. ........................................ 429/244; 29/623.21
[58] Field of Search ............................... 429/233, 234, 429/236, 241, 243, 244, 192; 29/623.4

[56] References Cited

U.S. PATENT DOCUMENTS

| | | | |
|---|---|---|---|
| 5,441,830 | 8/1995 | Moulton et al. | 429/212 |
| 5,456,000 | 10/1995 | Gozdz et al. | 29/623.2 |
| 5,476,734 | 12/1995 | Pulley et al. | 429/244 |
| 5,520,850 | 5/1996 | Chaloner-Gill et al. | 252/500 |
| 5,580,686 | 12/1996 | Shi et al. | 429/245 |

Primary Examiner—M. Nuzzolillo
Attorney, Agent, or Firm—Lionel N. White; Joseph Giordano

[57] ABSTRACT

Electrical connection is maintained between an electrical conductor element (32) and a fragile expanded-metal grid current collector element (12) of a flexible laminate structure rechargeable battery (10) by means of thermally-activated adhesive sheet material (34) which provides physical reinforcement as well as maintaining stable electrically-conductive contact between the elements. Such adhesive materials comprising a metal foil surface (46) may also provide direct electrical connection between current collector or battery electrode elements and external utilization devices.

14 Claims, 5 Drawing Sheets

ELECTRICAL CONNECTION FOR A POLYMERIC LAMINATE BATTERY STRUCTURE

BACKGROUND OF THE INVENTION

The present invention relates to secondary, rechargeable batteries, particularly such batteries which are constructed of layered, polymeric composition electrode and electrolyte elements laminated between current collector foils. More particularly, the invention relates to such batteries comprising ultrathin, reticulated collector foils and provides a means for making electrical connections between such collector elements or from collector foils to utilization devices.

Typical laminated polymeric composition battery structures with which the present invention is useful are described, for example, in U.S. Pat. Nos. 5,460,904 and 5,478,668. Such a battery comprises respective positive and negative polymeric matrix electrode composition films of lithium intercalation compound and carbon which are laminated to a common separator and to metal foil current collector elements that provide the primary terminals for electrical connections.

Due to the uniquely advantageous solvent extraction process utilized in the manufacture of the above-noted polymeric batteries, the current collector elements comprise at least one foil which will allow the ready passage of extraction fluid. Perforate or reticulate foil grids are particularly preferred in this role; however, the otherwise advantageous lightweight structure of such foil grids results in a fragile, limited-surface element which may not be conducive to the use of vigorous operations, such as soldering, embossing, or ultrasonic welding, commonly employed in the industry for attaching busses, wires, foils, or other electrical conductors to battery terminals, particularly to battery cell collector elements. The present invention provides means for establishing and maintaining physical electrical contact between such battery collector grid elements and other electrical conductors without resort to such potentially destructive techniques.

SUMMARY OF THE INVENTION

The present invention utilizes adhesive compositions, preferably heat-activated adhesives, to effect stable electrical connections to the reticulate or grid foils which are preferred materials for polymeric laminate battery current collectors.

In its simplest form, the invention may utilize the thermoplastic composition of the contiguous electrode layer to laminate a conductor foil of substantially greater strength into overlying contact with the fragile collector grid. However, an adhesive priming layer or a thermoadhesive coating is preferably applied to the conductor foil to enhance bonding to the electrode composition. Thus fixed in physical contact with the collector grid element, the conductor foil serves as a primary conductor of current for external utilization, or it may be employed as an integral base to which wires or other conductors may be affixed by commonly-employed welding or soldering means.

Thermoadhesive coatings on non-conductive, tape-like film substrates are particularly preferred for effectively joining sections of conductive foil grids in electrical contact, as well as for similarly joining foil grid or metal-coated plastic conductors to more substantial imperforate metal foil or wire electrical conductors.

The preferred, thermally-activated adhesive compositions useful in the present invention may be selected from any such materials, typically polymeric in nature, which generate a fluid tackiness in the range of about 85° C. to 125° C. and maintain good tensile strength in the usual battery operating temperature range of about −20° C. to 70° C. Adhesive affinity for metal surfaces is an additional advantage for useful compositions.

Suitable such thermoadhesive materials include ethylene acrylic acid copolymers, available commercially as aqueous dispersion priming compositions, e.g., Adcote primers of Morton International. Extruded films and substrate coatings of thermoplastic compounds have broad utility for this purpose and a particularly preferred class of such materials are the "ionomers" which generally comprise ionic ethylene interpolymers, such as described by Bonotto and Purcell in *Modern Plastics* (March 1965), commercially available, e.g., as Surlyn resins of Du Pont Company. Similarly available are extrusion-coated film and polymer/foil composite substrates which are applicable directly in the invention as adhesive connector elements, as well as battery enclosure media.

BRIEF DESCRIPTION OF THE DRAWINGS

The present invention will be described with reference to the accompanying drawing of which.

DESCRIPTION OF THE INVENTION

Figure 1:
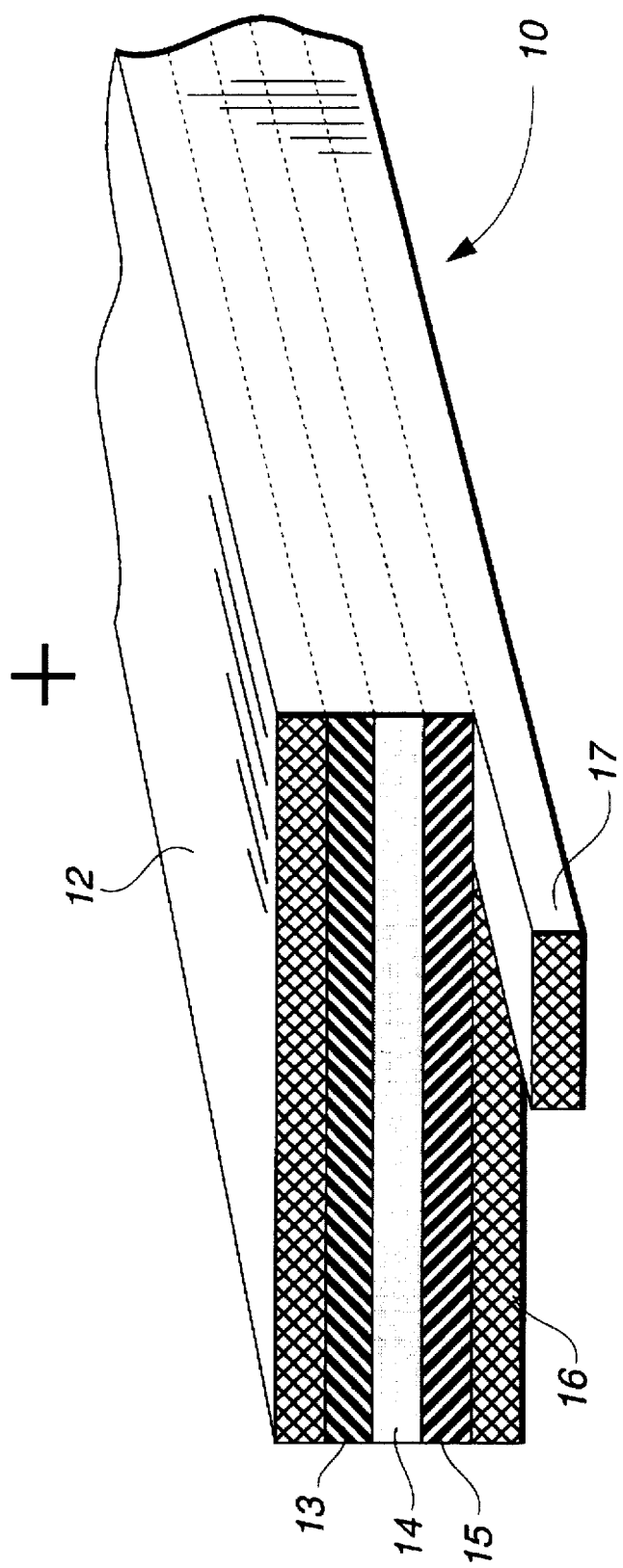
FIG. 1 is a perspective view of a representative section of a typical polymeric laminated battery structure.

The structure of a representative polymer-based Li-ion battery may be seen in the model of FIG. 1 as comprising a unitary laminate of a positive electrode composition layer 13 with its associated current collector element 12, an intermediate separator/electrolyte layer 14, and a negative electrode composition layer 15 with its associated current collector element 16. When initially assembled for lamination, the structure components typically include: as electrode 13, a 300 μm thick layer of 56 parts by weight of a $LiMn_2O_4$ intercalation compound and 6 parts of carbon black intimately dispersed in a binder matrix of 16 parts of an 88:12 vinylidene fluoride:hexafluoropropylene copolymer plasticized with 16 parts of dibutylphthalate (DBP); as separator 14, an 85 μm thick layer of 20 parts of colloidal silica intimately dispersed in 30 parts of the copolymer plasticized with 50 parts of DBP; and as electrode 15, a 200 μm thick layer of 56 parts of graphite and 3 parts of carbon black intimately dispersed in 15 parts of the copolymer plasticized with 23 parts of DBP.

Since, as described in the above-noted patents, the post-lamination processing of the battery structure will include a solvent extraction of the DBP plasticizer from the polymer matrices, one or both, as depicted in FIG. 1, of copper collector foil 12 and aluminum collector foil 16 may be reticulate, for example is in the form of a 50 μm thick expanded metal grid, such as the MicroGrid precision foil marketed by Delker Corporation, in order to provide suitable solvent porosity. A convenient electrical connection terminal may be provided as a collector grid tab 17; however, reliance upon such an extension of the delicate collector grid foil, particularly at the exterior of any protective battery enclosure package, severely detracts from a robust nature of the resulting battery. It is in part to this shortcoming that the present invention is directed.

Among the advantages of the polymeric battery structure is the capability of obtaining numerous battery cell shapes and sizes from a single master laminate battery sheet or continuous web. Die-cutting or other division of a master cell sheet yields multiple functional battery cells which vary with sheet area in capacity only, since the voltage range of a cell is determined by the compositions of the electrode couple. Thus, increases in battery voltage may be readily achieved by series-stacked multiplexing of sized battery cells, while battery capacity may be increased by parallel multiplexing. The latter, however, requires a multiplicity of intercell electrical connections which the present invention may readily provide.

Figure 2:
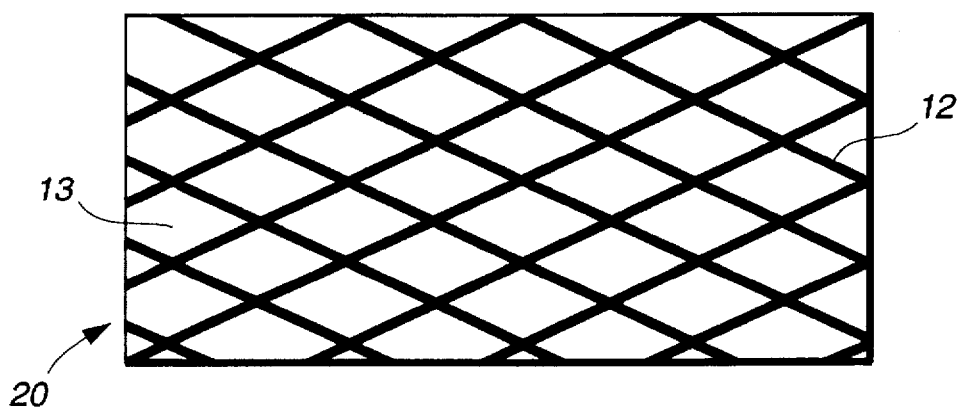
FIG. 2 is a plan view of a section of the battery structure of FIG. 1 showing a current collector grid member laminated to an underlying electrode layer.

Symmetrical cell sheet cutting, with guillotine apparatus for example, generally tends to be a more economical manufacturing operation, yet it prevents the formation of individual terminal connection tabs such as shown at 17 in FIG. 1. This result poses a problem of significant proportion in the noted parallel multiplexing, since there are available for electrical connections only the minimal surface areas of the laminated collector grids, as is apparent in the plan view of such a battery cell section 20 in FIG. 2. With so little area presented by grid strands 12, as well as the considerable exposed area of electrode composition 13, there is limited utility in commonly-used soldering or welding operations to establish substantial electrical contacts with collector grid 12.

Figure 3:
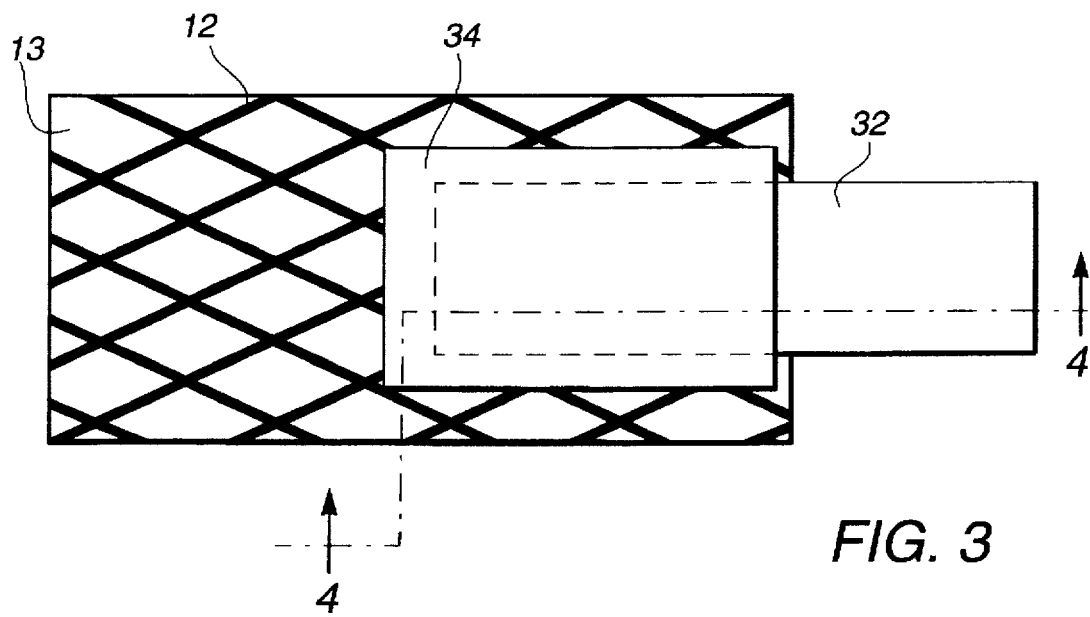
FIG. 3 is a plan view of a similar section of battery structure having a metal foil conductor affixed in electrical contact with the collector member by means of an adhesive tape element according to the present invention.
Figure 4:
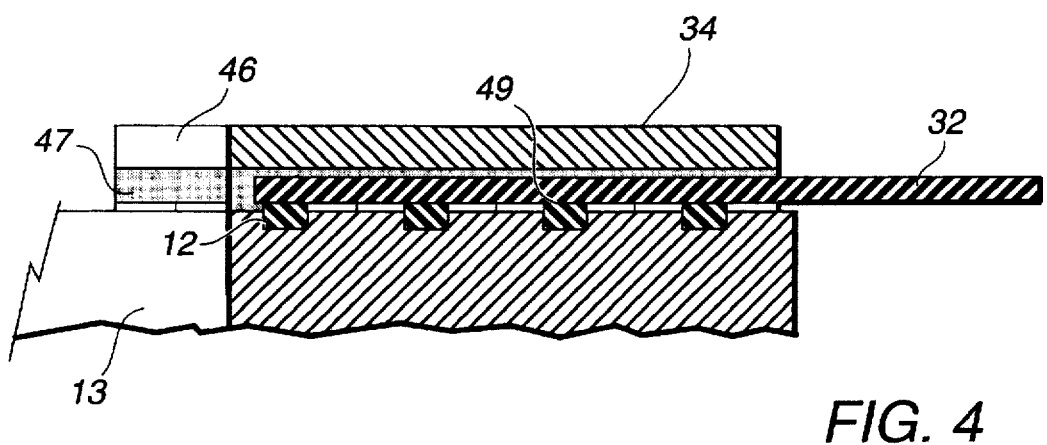
FIG. 4 is a partial cut-away elevational view of the electrical contact structure of FIG. 3 taken along line 4—4.

Such a dilemma is solved by application of the present invention as shown in FIG. 3 where a terminal strip 32 of solid copper foil is firmly affixed in physical electrical contact with collector grid 12 by means of a overlying adhesive tape 34. As may be seen more clearly in FIG. 4, tape 34 comprises, in a preferred embodiment, a flexible substrate 46 of stable polymer or polymer/foil composite bearing a layer 47 of a thermally-activatable adhesive ionomer composition. In the connection operation, foil conductor 32 is laid in physical contact, as at 49, with exposed collector grid 12, and tape 34, sized to encompass a significant portion of its periphery, is overlaid upon foil strip 32. This overlay is then compressed under a common heat-sealing shoe or bar, not shown, to activate adhesive 47 and cause it to flow about the surfaces of electrode 13, grid 12, and conductor strip 32, to effect, upon cooling, a firm, stable contact connection between grid 12 and conductor 32 which may extend to a utilization device or serve as a base for further soldered or welded connection of a wire or other type of conductor.

Figure 5:
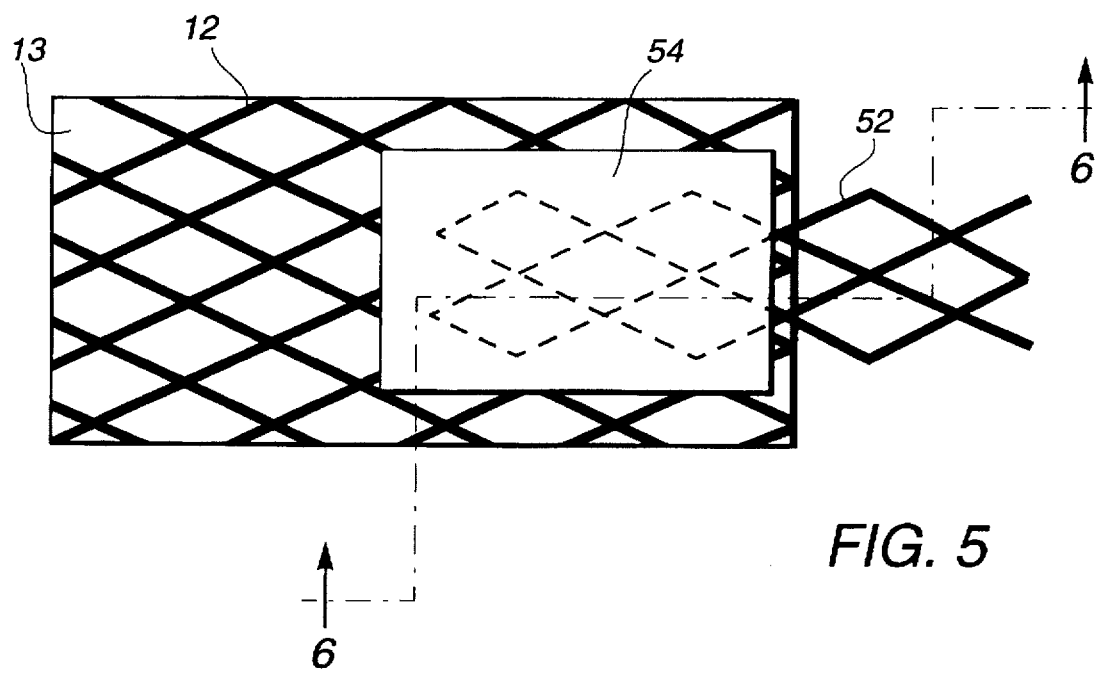
FIG. 5 is a plan view of a similar section of battery structure having a metal grid conductor affixed thereto in electrical contact by means of the adhesive tape element.
Figure 6:
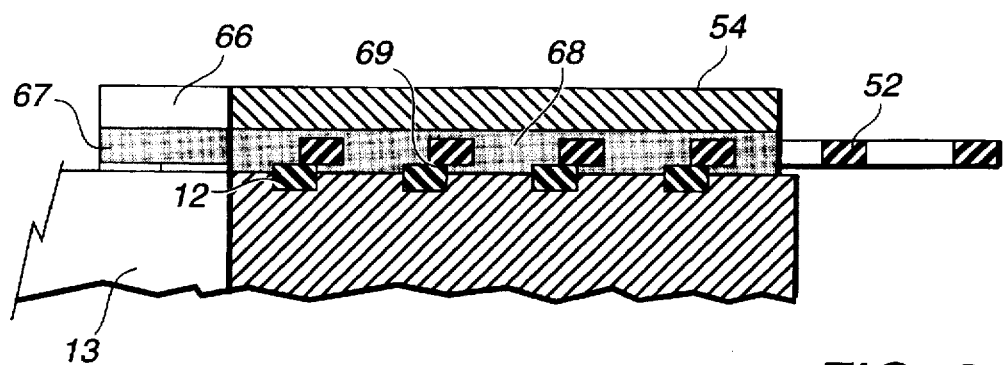
FIG. 6 is a partial cut-away elevational view of the contact structure of FIG. 5 taken along line 6—6.

A variant arrangement, as depicted in FIG. 5, may be employed where it is desired to establish an electrical connection between cell collector grid 12 and a similar lightweight grid foil strip 52, such as might be utilized within a protective battery enclosure to effect parallel intercell connections. There the grid contact connection, as at 69, is maintained by adhesive 67 and its supporting substrate 66, while the body of adhesive, as at 68, provides surrounding reinforcement for grid strip 52.

Figure 7:
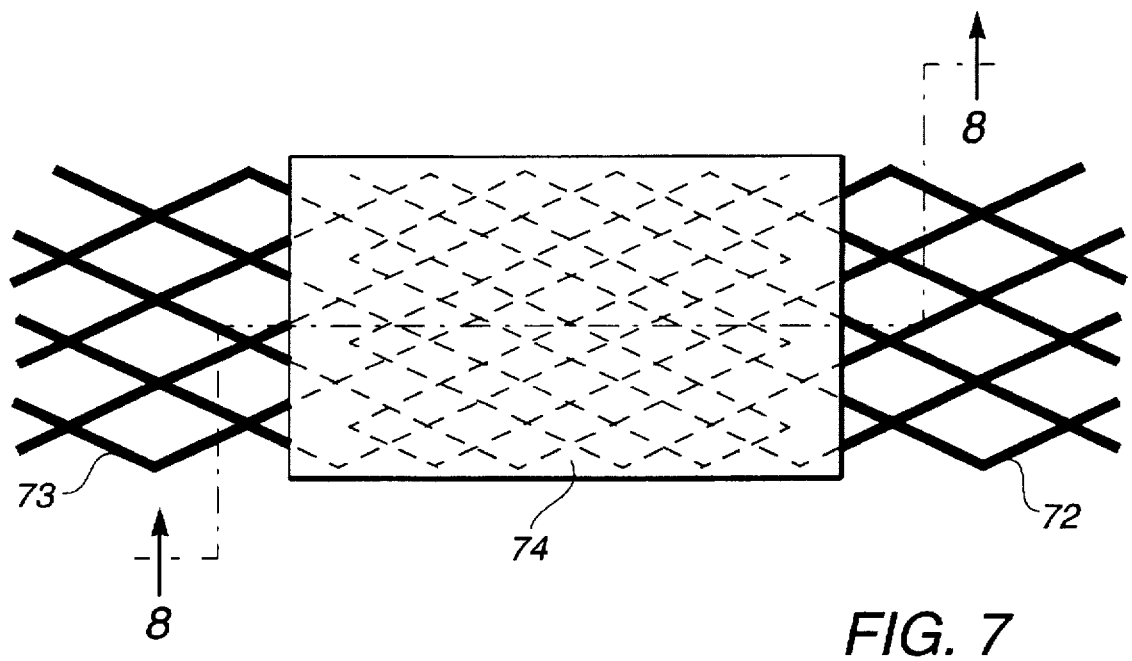
FIG. 7 is a plan view of two strips of metal grid conductor foil affixed in electrical contact by means of an encompassing adhesive tape element.
Figure 8:
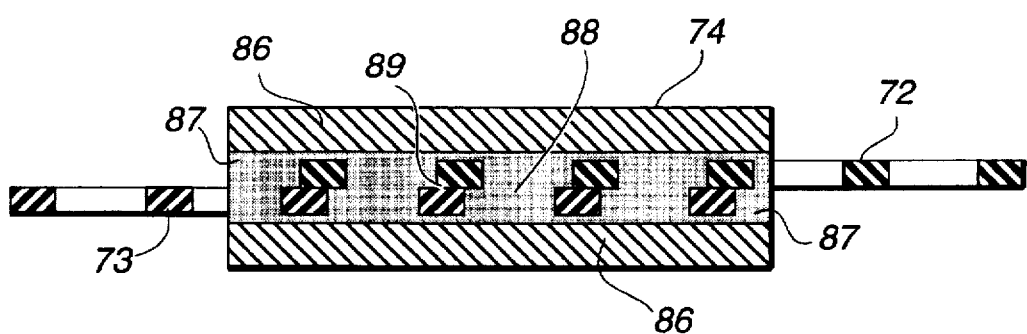
FIG. 8 is a partial cut-away elevational view of the contact structure of FIG. 7 taken along line 8—8 showing the implementation of face-to-face portions of the adhesive tape element.

In another embodiment of the invention, as depicted in FIG. 7, individual strips 72, 73 of foil grid may be electrically connected by means of tape 74 in order, for example, to extend an internal battery package conductor. As seen more clearly in FIG. 8, it is preferred to apply a portion of tape to the outwardly-disposed surface of each of grid strips 72, 73, either as separate tape sections or as a single tape folded to encompass both surfaces, in order to take advantage of the extra cohesive bond strength achieved at the interface of the activated adhesive composition layers 87 in the open grid areas 88. In this manner the electrical connection at 89 is reinforced by the mass of ionomer composition 87, as well as by tape substrate 86.

Figure 9:
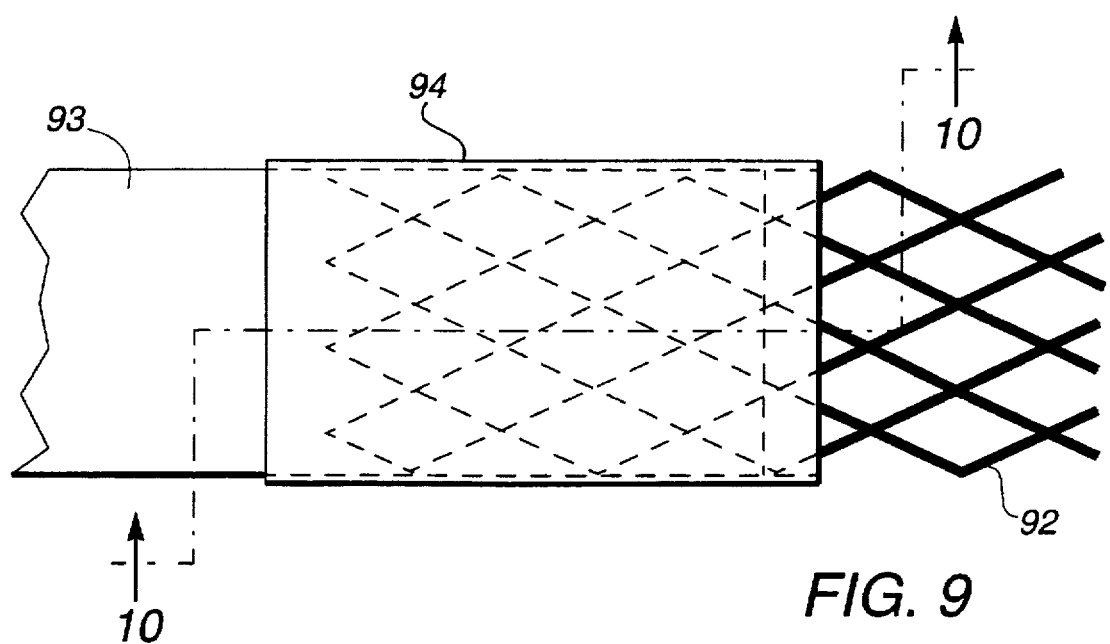
FIG. 9 is a plan view of two respective strips of imperforate metal foil and metal grid conductors affixed in electrical contact by means of an encompassing adhesive tape element.
Figure 10:
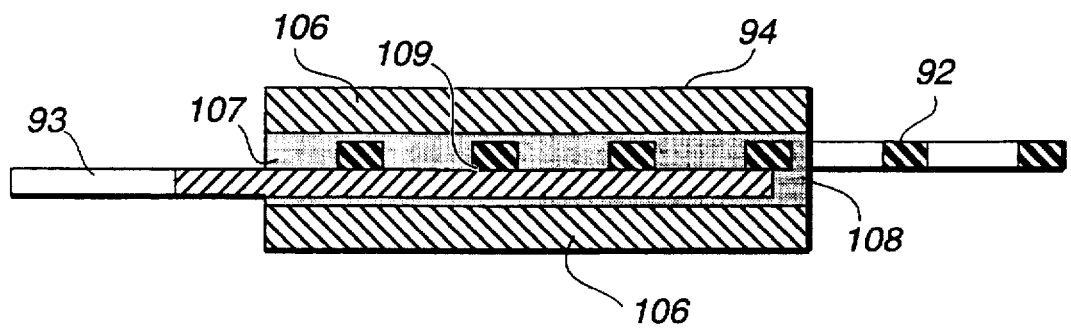
FIG. 10 is a partial cut-away elevational view of a contact structure of FIG. 9 taken along line 10—10 showing the implementation of face-to-face portions of the adhesive tape element.
Figure 11:
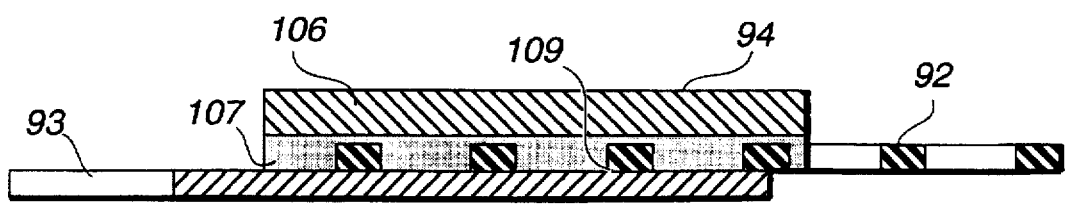
FIG. 11 is a similar cut-away elevational view of a structure of FIG. 9 showing the implementation of a single overlying adhesive tape element.

Similarly, a folded portion of tape 94, in FIG. 9, may be employed to electrically connect strips of foil grid 92 and solid foil 93, utilizing both the activated adhesion of ionomer composition 107 to foils 92, 93 and the cohesion of composition surfaces at 108, as seen in FIG. 10. An alternative implementation, as shown in FIG. 11, relies on the effective adhesion between a single layer of tape 94 and foils 92, 93 to maintain the stable electrical connection contact at foil interfaces 109.

It is anticipated that numerous other implementations of the described manner of effecting stable electrical contacts and connections for polymeric batteries, such as including electrically-conductive components, e.g., carbon or metal powder, in the adhesive composition to enhance the conductivity of the connection, will occur to the skilled artisan, and such variants are nonetheless intended to be within the scope of the present invention as defined in the appended claims.

What is claimed is:

1. A method of making an electrical connection between a pair of electrically-conductive elements characterized in that
   a) said conductive elements are placed in physical, electrically-conductive contact; and
   b) at least a portion of an adhesive element comprising a flexible substrate bearing a layer of adhesive composition is applied over a first of said conductive elements to adhesively engage said first element and at least a portion of the surface of the second of said elements which encompasses the area of said physical contact, thereby maintaining said physical contact.

2. A method according to claim 1 wherein said adhesive composition is heat-activatable.

3. A method according to claim 2 wherein said adhesive composition comprises a polymeric ionomer.

4. A method according to claim 1 wherein at least the first of said conductive elements comprises a reticulated foil grid and said adhesive composition engages said second element surface through the open areas of said grid.

5. A method according to claim 1 wherein each of said conductive elements comprises a reticulated foil grid and at least a portion of an adhesive element is applied over each said conductive element, whereby the adhesive compositions of said adhesive element portions are engaged in a cohesive bond through the open areas of said grids.

6. A method of making an electrical connection to a battery structure comprising laminated polymeric electrode and separator/electrolyte members and having at least one electrically-conductive collector member outwardly exposed at the surface of an associated electrode member, said connection being made by fixed electrical contact between a conductor element and said collector member characterized in that
   a) said conductor element is placed in physical contact with said collector member; and
   b) at least a portion of an adhesive element comprising a flexible substrate bearing a layer of heat-activatable polymeric ionomer adhesive composition is applied over said conductor element to adhesively engage said conductor element and at least a portion of the surface of said collector member encompassing the area of said physical contact, thereby maintaining said physical contact.

7. A method according to claim 6 wherein said collector member comprises a reticulated foil grid and said adhesive composition engages at least a portion of said associated electrode member through the open areas of said grid.

8. A battery structure comprising laminated polymeric electrode and separator/electrolyte members, at least one electrically-conductive collector member having a surface disposed outwardly from an associated electrode member, and an electrical conductor member in fixed electrical contact with said collector member characterized in that
   a) said conductor member is in physical contact with said collector member; and
   b) said physical contact is maintained by an adhesive element comprising a flexible substrate bearing a layer of adhesive composition adhesively engaging said conductor member and at least a portion of the surface of said collector member encompassing the area of said physical contact.

9. A battery structure according to claim 8 wherein said adhesive composition is heat-activatable.

10. A battery structure according to claim 9 wherein said adhesive composition comprises a polymeric ionomer.

11. A battery structure according to claim 8 wherein said collector member comprises a reticulated foil grid and said adhesive composition engages said conductor member through the open areas of said grid.

12. A battery structure according to claim 11 wherein at least a portion of an adhesive element overlies the outwardly-disposed surfaces of each of said collector and conductor members, whereby the adhesive compositions of said adhesive element portions are engaged in a cohesive bond through the open areas of said grid.

13. A battery structure according to claim 11 wherein each of said collector and conductor members comprises a reticulated foil grid and at least a portion of an adhesive element overlies the outwardly-disposed surfaces of said each member, whereby the adhesive compositions of said adhesive element portions are engaged in a cohesive bond through the open areas of said grids.

14. A battery structure according to claim 8 wherein said collector member comprises a reticulated foil grid outwardly exposed at the surface of said associated electrode member and said adhesive composition engages at least a portion of said electrode member through the open areas of said grid.

* * * * *